(12) United States Patent
Heidemeyer et al.

(10) Patent No.: US 9,701,193 B2
(45) Date of Patent: Jul. 11, 2017

(54) VENTILATING DEVICE FOR LIQUID CONTAINERS, IN PARTICULAR FOR LIQUID CONTAINERS FOR AN AQUEOUS UREA SOLUTION

(75) Inventors: Timm Heidemeyer, Cologne (DE); Volker Treudt, Windeck (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 13/996,177

(22) PCT Filed: Nov. 19, 2011

(86) PCT No.: PCT/EP2011/005844
§ 371 (c)(1),
(2), (4) Date: Jun. 20, 2013

(87) PCT Pub. No.: WO2012/084108
PCT Pub. Date: Jun. 28, 2012

(65) Prior Publication Data
US 2013/0270284 A1 Oct. 17, 2013

(30) Foreign Application Priority Data
Dec. 20, 2010 (DE) .................. 10 2010 055 184

(51) Int. Cl.
*B60K 15/035* (2006.01)
*B60K 13/04* (2006.01)
*B60K 15/03* (2006.01)

(52) U.S. Cl.
CPC ...... *B60K 15/035* (2013.01); *B60K 15/03519* (2013.01); *B60K 13/04* (2013.01); *B60K 2015/03276* (2013.01)

(58) Field of Classification Search
CPC .................................................. F01P 11/0238
(Continued)

(56) References Cited

U.S. PATENT DOCUMENTS 4,176,678 A 12/1979 Marchaix et al.
4,896,789 A 1/1990 Federspiel
(Continued)

FOREIGN PATENT DOCUMENTS

CN 1179136 A 4/1998
CN 101353997 A 1/2009
(Continued)

OTHER PUBLICATIONS

GB2462176A.pdf.*
(Continued)

*Primary Examiner* — J. Gregory Pickett
*Assistant Examiner* — Allan Stevens
(74) *Attorney, Agent, or Firm* — Grossman Tucker Perreault & Pfleger, PLLC

(57) ABSTRACT

The invention relates to a ventilating device (2) for liquid containers (1), in particular for liquid containers (1) for an aqueous urea solution, including a housing (3) which can be mounted at an opening of the liquid container (1) and has a first opening (4) to the liquid container (1) and a second opening (5) to the surroundings of the liquid container (1), a diaphragm (6) which is arranged within the housing (3), is permeable to air, is impermeable to liquid and is configured in such a way that a deformation of the diaphragm (6) takes place by a pressure change in the liquid container (1), as a result of which the volume within the housing (3) within the diaphragm (6) changes, with the result that the displaced volume leaves the housing (3) via the second opening (5) to the surroundings of the liquid container (1). Furthermore, the invention relates to a liquid container (1) having a ventilating device (2) according to the invention.

15 Claims, 2 Drawing Sheets

Figure 1:
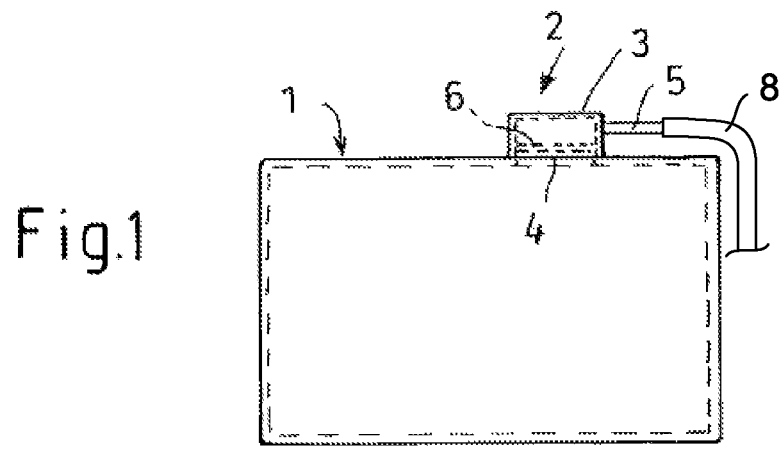

(58) Field of Classification Search
USPC .............. 220/745, 203.18, DIG. 32, 203.16, 220/203.11, DIG. 33, 746
See application file for complete search history.

(56) References Cited

U.S. PATENT DOCUMENTS

| | | | |
|---|---|---|---|
| 5,722,374 | A | 3/1998 | Kidokoro et al. |
| 6,557,719 | B1 | 5/2003 | Arnal et al. |
| 7,491,258 | B2 | 2/2009 | Gouzou et al. |
| 7,628,143 | B2 * | 12/2009 | Yamada et al. ............... 123/509 |
| 8,360,087 | B2 | 1/2013 | Kolberg et al. |
| 8,763,635 | B2 | 7/2014 | Erdmann |
| 2010/0024898 | A1 | 2/2010 | Bansal et al. |

FOREIGN PATENT DOCUMENTS

| | | | |
|---|---|---|---|
| DE | 3708950 | A1 | 9/1988 |
| DE | 3923530 | A1 | 1/1990 |
| DE | 4027306 | A1 | 3/1992 |
| DE | 69510118 | T2 | 10/1999 |
| DE | 102006060865 | A1 | 7/2007 |
| DE | 102006015263 | A1 | 10/2007 |
| DE | 102006050809 | A1 | 4/2008 |
| DE | 102008040479 | A1 | 2/2009 |
| DE | 102008044167 | A1 | 6/2010 |
| DE | 102009046965 | A1 | 5/2011 |
| EP | 0823577 | A2 | 2/1998 |
| EP | 1028017 | A2 | 8/2000 |
| GB | 1557504 | A | 12/1979 |
| GB | 2462176 | A * | 2/2010 |
| JP | H10184463 | A | 7/1998 |
| JP | H10184476 | A | 7/1998 |
| JP | 2002103994 | A | 4/2002 |
| WO | 2005053772 | A1 | 6/2005 |
| WO | 2006113690 | A2 | 10/2006 |
| WO | 2010099907 | A1 | 9/2010 |
| WO | 2010106421 | A2 | 9/2010 |

OTHER PUBLICATIONS

PCT International Preliminary Report on Patentability mailed Jan. 25, 2013, with Annex containing amended pages, received in corresponding PCT Application No. PCT/EP11/05844, 17 pgs.
PCT International Search Report mailed Aug. 16, 2012, received in corresponding PCT Application No. PCT/EP11/05844, 2 pgs.
PCT Written Opinion mailed Aug. 16, 2012, received in corresponding PCT Application No. PCT/EP11/05844, 7 pgs.
English translation of Chinese Office Action dated Apr. 1, 2015, received in corresponding Chinese Application No. 201180061244.5, 2 pgs.
English translation of European Opposition dated Jul. 15, 2015, received in corresponding EP Patent No. 2655115, 46 pgs.
"Celazole PolyBenzImidazole Specifications", http://Boedeker.com/celazole.htm, Boedeker Plastics: Celazole PBI PolyBenzImidazole Datasheet, 2016, 3 pgs.
Brydson, J.A., "Plastics Materials" Fourth Edition, Butterworth Scientific, Great Britain 1982, pp. 395-396, 4 pgs total.

* cited by examiner

VENTILATING DEVICE FOR LIQUID CONTAINERS, IN PARTICULAR FOR LIQUID CONTAINERS FOR AN AQUEOUS UREA SOLUTION

The invention relates to a ventilating device for liquid containers, in particular for liquid containers for an aqueous urea solution.

The SCR (selective catalytic reduction) process is used increasingly in automotive technology, in order to reduce the nitrogen oxide emissions in these vehicles. The ammonia which is required for the SCR reaction is not used directly, but rather in the form of a 32.5% aqueous urea solution according to DIN 70070. The aqueous urea solution is injected by the SCR catalytic converter into the exhaust gas section, for example by means of a metering pump or an injector. Ammonia and $CO_2$ are produced from the urea/water solution by a hydrolysis reaction. The ammonia which is produced in this way can react with the nitrogen oxides in the exhaust gas and thus reduce the nitrogen oxide emissions. The quantity of the injected urea is dependent on the nitrogen oxide emissions of the engine and therefore on the instantaneous speed and the torque of the engine. Here, the degree of efficiency of the SCR catalytic converter is dependent on the fact that the aqueous urea solution is injected at the correct ratio to the nitrogen oxide emissions of the engine. In the case of an injection of aqueous urea solution which is too low, the degree of efficiency of the nitrogen oxide reduction falls. If too much urea is injected, the ammonia which is formed from it cannot react with nitrogen oxides and pass into the surroundings. As accurate a delivery as possible of aqueous urea solution from the liquid container for the aqueous urea solution to the SCR catalytic converter is therefore necessary, preferably in the range of milliliters.

For example, an excess pressure or vacuum can occur within a liquid container as a result of a change in the ambient temperature, a change in the air pressure outside the liquid container or, if the liquid container is used in a vehicle, by uphill or downhill driving. In order to equalize the excess pressure or vacuum within the liquid container and therefore to prevent damage of the liquid container, ventilating devices are known from the prior art.

A ventilating device is usually arranged between the liquid container and the atmosphere outside the liquid container, in order to dissipate an excess pressure or vacuum within the liquid container. The ventilating devices which are known from the prior art comprise a ventilating valve on the upper wall of the liquid container.

DE 10 2005 052 586 A1 has disclosed an aerating and ventilating device for tanks which makes it possible to control the gas exchange between the tank and its outer surroundings, the aerating and ventilating device comprising an aerating and ventilating element which makes it possible to limit the excess pressure or vacuum within the tank. The disclosed aerating and ventilating device has a further device between the tank and the aerating and ventilating element, which further device is configured in such a way that gases can escape from the tank and the liquid which is contained in the tank is retained. This device which is arranged between the tank and the aerating and ventilating element is arranged in an inclined manner with regard to the horizontal.

The ventilating devices which are known from the prior art are reliable only until water penetrates from the outside to the ventilating device, for example as a result of spray, washing the car, fording water and/or thaw water, since the water can lead to clogging of the ventilation element.

GB 2462176 A discloses a ventilating device for a fuel tank including a fuel cap configured to close the opening of the fuel tank, wherein the fuel cap comprises a main body portion having a vent aperture formed therein, wherein a nanoporous membrane separator is disposed in the main body portion and in fluid communication with the vent aperture, wherein the nanoporous membrane separator comprises a membrane, and the membrane is permeable to a selected one or both of a fuel vapor and air and is impermeable to a liquid fuel.

GB 1 557 504 also discloses a device for venting a fuel tank, this device comprises two substantially cylindrical concentric members located one within the other and forming a valve body and each providing an annular edge portion, the two edge portions facing towards each other, and a flexible disc of a hydrocarbon resistant artificial or natural elastomer, having at least one through slot whose edges touch each other in a rest condition of the disc and thereby close the slot, but whose edges can be parted by deformation of the disc and thereby open the slot, the disc being moveably located between said edge portion in a clearance between the edge portion greater than the thickness of the disc.

A fuel tank for liquid fuel with a gas evacuating system is for instance disclosed in U.S. Pat. No. 6,557,719 B1. The gas evacuating system includes an opening in the tank which is closed by a membrane suitable for allowing air and fuel vapor to pass therethrough while preventing liquid fuel from passing therethrough. The membrane is situated inside the tank and extends over the entire cross section of the opening. A grid arranged over the membrane serves to support the membrane by providing it with backing through as to prevent it from tearing under the weight of liquid fuel in the event of a vehicle roll-over.

The present invention is therefore based on the object of providing a ventilating device which ensures sufficient aeration and ventilation of the liquid container even after penetration of water to the ventilation element, aeration of a liquid container.

According to the invention, the object is achieved by a ventilating device for liquid containers, in particular for liquid containers for an aqueous urea solution, comprising: a housing which can be mounted at an opening of the liquid container and has a first opening to the liquid container and a second opening to the surroundings of the liquid container, a diaphragm which is arranged within the housing, is permeable to air, is impermeable to liquid and is configured in such a way that a deformation of the diaphragm takes place as a result of pressure change in the liquid container, as a result of which the volume within the housing above the diaphragm changes, with the result that the displaced volume leaves the housing via the second opening to the surroundings of the liquid container, wherein the diaphragm is arranged within the housing in a not tensioned state, so that the diaphragm sags downward under the force of gravity, so that the lowest point of the diaphragm lies at a lower level in the installation position than the plane of fastening points of the diaphragm.

Here, the diaphragm is arranged within the housing in such a way that the housing is divided into two volumes which are separated from one another, it being possible for a gas exchange but no liquid exchange to take place between the two volumes. As a result, the diaphragm extends over the entire cross section of the housing.

In the meaning of the invention, a diaphragm is a semi-permeable dividing layer which deforms as a result of pressure changes in the liquid container without being damaged. The semipermeable diaphragm is permeable to gases and impermeable to liquids.

The ventilating device according to the invention has the advantage that the diaphragm deforms as a result of a pressure change within the liquid container, for example caused by temperature fluctuations, pressure changes outside the liquid container and/or as a result of uphill or downhill driving of a vehicle, in which the liquid container is used. As a result of the deformation of the diaphragm, for example in the event of a pressure rise within the liquid container, the volume within the housing of the ventilating device above the diaphragm changes. As a result of the deformation of the diaphragm, a pumping action is achieved, with the result that the displaced volume within the housing above the diaphragm is transported away via the second opening to the surroundings of the liquid container. The water situated above the diaphragm is therefore transported away, via the second opening, out of the housing into the surroundings of the liquid container, as a result of which the diaphragm is freed from the liquid which is situated on it and aeration and ventilation of the liquid container is ensured.

According to one variant of the invention, the ventilating device comprises a diaphragm carrier within the housing, to which diaphragm carrier the diaphragm is attached. This has the advantage that the diaphragm can be exchanged simply together with the diaphragm carrier in the case of damage.

In the meaning of the invention, a diaphragm carrier is an additional component, on which the diaphragm is molded. The diaphragm carrier can be arranged within the housing of the ventilating device in such a way that the diaphragm divides the volume of the housing into two volumes which are separated from one another for liquids. The diaphragm carrier is preferably connected to the housing in a redetachable manner.

According to one preferred variant of the invention, the diaphragm carrier or the housing of the ventilating device comprises one or more struts which extend through the interior of the housing or the diaphragm carrier, preferably in a horizontal direction in the installation position. As a result, the diaphragm is attached at its circumference to the housing or the diaphragm carrier and is supported within the clamped area by the struts, as a result of which damage of the diaphragm is prevented. The diaphragm is preferably connected fixedly both at its circumference to the diaphragm carrier or to the housing and to the struts. The diaphragm is therefore divided by the struts into a plurality of elements, each element being capable of bearing greater loads than a diaphragm which is clamped without struts.

According to one particularly preferred embodiment, the struts together have a star or cross shape.

In one advantageous variant, the diaphragm carrier consists of polyethylene (PE) and preferably of polyethylene with a high density (PE-HD).

According to one variant of the invention, the ventilating device is mounted on the upper (in the installation position) face of the liquid container. This has the advantage that there is a space filled with air or gas between the liquid which is situated in the liquid container and the ventilating device, with the result that the ventilating device is not clogged by the liquid which is situated in the liquid container.

In one advantageous variant, the diaphragm is arranged in a horizontal (in the installation position) plane within the housing of the ventilating device. As a result, the liquid which is possibly situated in the housing, above the diaphragm, is distributed uniformly on the diaphragm, with the result that overloading of individual diaphragm elements or sections is avoided.

In one expedient variant, the diaphragm consists of polytetrafluoroethylene (PTFE). A diaphragm which is produced from PTFE has great resistance and has a low tendency to be loaded by foreign substances.

The diaphragm is expediently attached by being molded into the housing of the ventilating device or by being molded between the struts in the housing.

According to one preferred variant of the invention, the diaphragm is not tensioned in an unloaded state. In the meaning of the invention, not tensioned means that the diaphragm sags downward slightly in a horizontal installation position in comparison with the fastening of the circumference of the diaphragm to the housing in the horizontal direction. As a result of a non-tensioned installation of this type of the diaphragm within the housing, the deformation of the diaphragm is increased as a result of pressure change in the liquid container, with the result that the achieved pumping action is increased. The diaphragm not being tensioned in the unloaded state can be achieved, for example, by the fact that, directly after the production of the housing, the diaphragm is introduced into the latter with an accurate fit, as a result of which the non-tensioned state is achieved by following component shrinkage of the housing.

In a further variant of the invention, that surface of the diaphragm which points to the second opening repels liquid. This has the advantage that the liquid which is situated on the diaphragm forms relatively large drops or islands as a result of the surface tension inherent to the liquid. This drop or island formation is increased, in particular, by very small deformation of the diaphragm as a result of pressure change within the liquid container. A formation of drops or islands has the advantage that the entire diaphragm is not covered with liquid, but rather merely a part, with the result that the remaining part can ensure ventilation of the liquid container.

According to one variant of the invention, the second opening has a connection for a fluid line. The connected fluid line expediently has a maximum length of 10 cm and is arranged in a downward manner from the connection for the fluid line in the installation position. As a result of the fluid line, the volume which is displaced above the diaphragm can be transported away from the liquid container via the second opening and the fluid line.

Furthermore, the object is achieved by a liquid container, in particular for an aqueous urea solution, comprising a ventilating device according to the invention.

According to one expedient variant, the liquid container and the ventilating device are configured in one piece.

In the design of the diaphragm and in the arrangement of the diaphragm within the housing, it is to be ensured that the pressure forces which occur within the liquid container are lower than the tear force, at which the diaphragm is detached from the housing. Furthermore, it is to be ensured that the deformation of the diaphragm which is caused by the pressure forces which occur within the fuel container does not exceed the maximum permissible specific extension of the diaphragm material.

As a result of the maximum pressure change within the liquid container, the diaphragm is deformed between two maximum deflections, which results in a maximum pumping volume of the diaphragm. According to one expedient variant of the invention, this maximum pumping volume is at least 1.5 times as great as the volume within the housing above the diaphragm, preferably 2.0 times as great. The quotient of the area of the non-arched diaphragm to the maximum pumping volume of the diaphragm is expediently approximately equal to 0.65.

According to one advantageous variant, the volume within the housing above the diaphragm to the side opening which is attached at the lowest point and via which liquid can drain from the housing is smaller than the maximum pumping volume of the diaphragm, preferably only 25% of the maximum pumping volume of the diaphragm.

Figure 2:
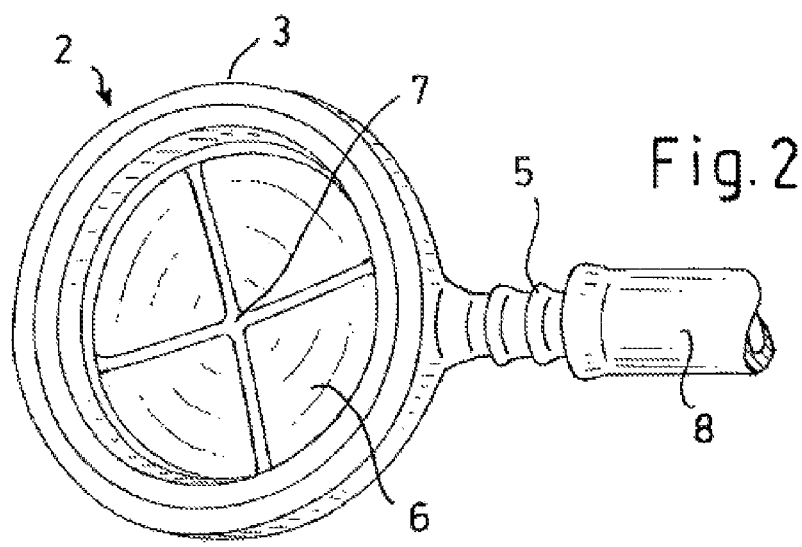
Figure 3:
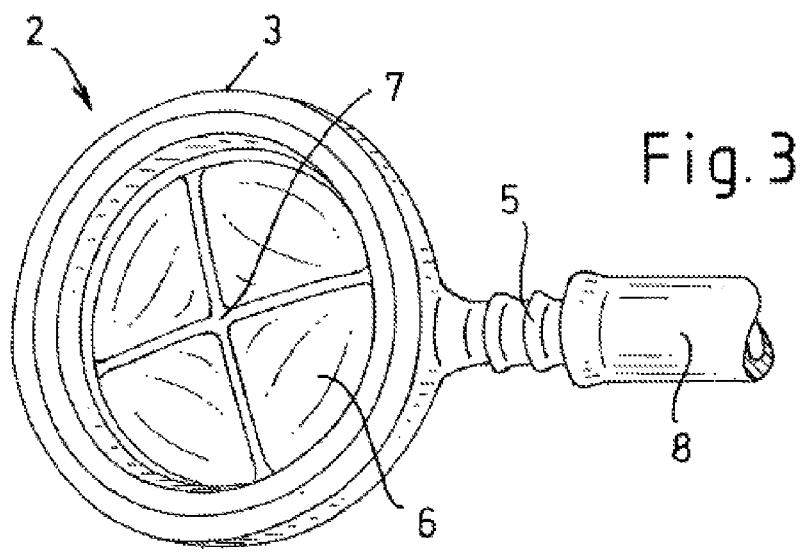

In the following text, the invention will be explained in greater detail using one exemplary embodiment which is shown in the figures, in which:

FIG. 1 shows a diagrammatic view of a liquid container having a ventilating device according to the invention, FIG. 2 shows a perspective view of a ventilating device according to the invention in the direction of the first opening with a maximum deflection of the diaphragm into the highest orientation in the installation position, FIG. 3 shows the ventilating device from FIG. 2 with a deflection of the diaphragm into the lowest deflection in the installation position, and FIG. 4 shows sectional views through a ventilating device according to the invention in the case of different deflections of the diaphragm.

FIG. 1 shows a liquid container 1, in particular for an aqueous urea solution, having a ventilating device 2 according to the invention. The ventilating device 2 comprises a housing 3 which is mounted at an opening of the liquid container 1 and has a first opening 4 to the liquid container 1 and a second opening 5 to the surroundings of the liquid container 1. There is therefore a fluid connection between the interior of the liquid container 1 and the interior of the housing 3, and a fluid connection between the interior of the housing 3 and the surroundings of the liquid container 1. A diaphragm 6 is arranged within the housing 3, which diaphragm is permeable to air, is impermeable to liquid and is configured in such a way that a deformation of the diaphragm 6 takes place by pressure change in the liquid container 1. As a result of the deformation of the diaphragm 6, the volume within the housing 3 above the diaphragm 6 changes, with the result that the displaced volume leaves the housing 3 via the second opening 5 to the surroundings of the liquid container 1.

A liquid which is possibly situated within the housing 3 above the diaphragm 6 is therefore displaced at least partially out of the housing 3. This affords the advantage that the diaphragm 6 which was previously hidden by the liquid becomes permeable again for air and/or gas.

The ventilating device 2 is mounted on the upper (in the installation position) face of the liquid container 1, for example by means of a latching or screw connection.

The diaphragm 6 is arranged in a horizontal (in the installation position) plane within the housing 3 and extends over the entire cross section of the housing, as a result of which the latter is divided into two volumes. A gas exchange but no liquid exchange can take place between the two volumes. The diaphragm consists, for example, of polytetrafluoroethylene (PTFE).

According to one preferred variant, the diaphragm 6 is arranged within the housing 3 in such a way that it is not tensioned in an unloaded state. In the meaning of the invention, unloaded state means that no forces act on the diaphragm 6 apart from the force of gravity. In the sense of the invention, not tensioned means that the diaphragm 6 sags downward in comparison with the fastening points in the installation position, that is to say the lowest point of the diaphragm 6 lies at a lower level in the installation position than the plane of the fastening points.

That surface of the diaphragm 6 which points to the second opening 5 is configured so as to repel liquid. This achieves a situation where liquids which are situated within the housing 3 above the diaphragm 6 collect to form drops or islands as a result of low movement of the diaphragm 6 at some points of the diaphragm 6, with the result that the remaining diaphragm surface can still contribute to the ventilation of the liquid container 1. The passage of air and/or gases through the diaphragm already boosts the formation of islands and/or drops.

The second opening 5 has a connection for a fluid line 8, the connected fluid line 8 having a maximum length of 10 cm and being arranged in a downward manner from the connection for the fluid line 8 in the installation position.

FIG. 2 shows a perspective view of a ventilating device 2 according to the invention in the direction of the first opening 4 from the lower side in the installation position. A diaphragm carrier 7, to which the diaphragm 6 is attached, is arranged within the housing 3. The diaphragm carrier 7 comprises a plurality of struts which extend through the interior of the housing 3. In the installation position, the struts of the diaphragm carrier 7 extend in a horizontal direction within the housing 3. The struts together have a cross shape, as can be gathered from FIG. 2.

The diaphragm carrier 7 consists of polyethylene (PE) and preferably of polyethylene with a high density (PE-HD).

The diaphragm 6 shown in FIG. 2 within the housing 3 is deflected upward in a maximum horizontal orientation in the installation position.

The diaphragm shown in FIG. 3 is shown in the opposite maximum deflection downward.

Figure 4A:
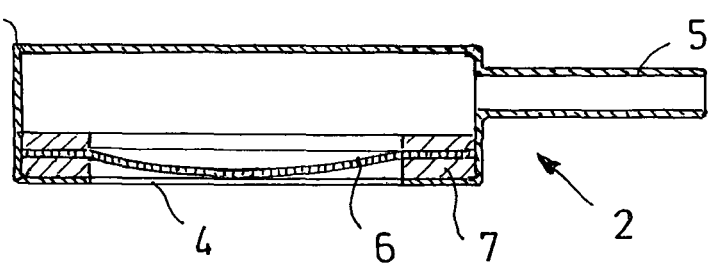

FIGS. 4a to 4d show sectional views through a ventilating device 2 according to the invention with different diaphragm deflections. In FIG. 4a, the diaphragm 6 within the housing 3 of the ventilating device 2 in the installation position is deflected in a horizontal direction downward. This corresponds, for example, to the untensioned state when the diaphragm 6 is unloaded.

Figure 4B:
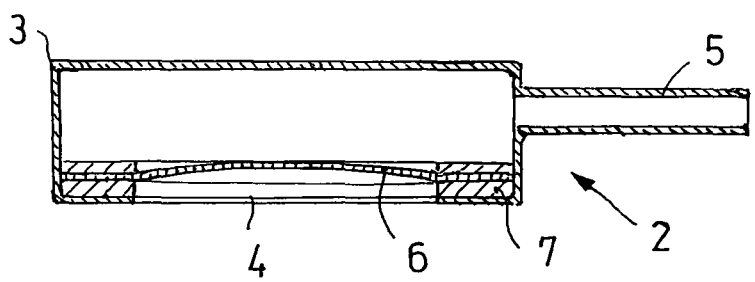

As a result of a pressure rise within the liquid container 1, a force is exerted on the diaphragm 6 through the opening within the liquid container 1 and the first opening 4 of the housing 3, as a result of which said diaphragm 6 is deflected upward in the installation position (FIG. 4b). As a result, the volume within the housing 3 above the diaphragm 6 changes, with the result that the displaced volume leaves the housing 3 via the second opening 5 to the surroundings of the liquid container 1. Should a liquid be situated within the housing 3 above the diaphragm 6, said liquid will leave the housing 3 via the second opening 5 with the displaced volume. A penetration of the liquid into the liquid container 1 is prevented by the fact that the diaphragm 6 is configured so as to be impermeable to liquid.

Figure 4C:
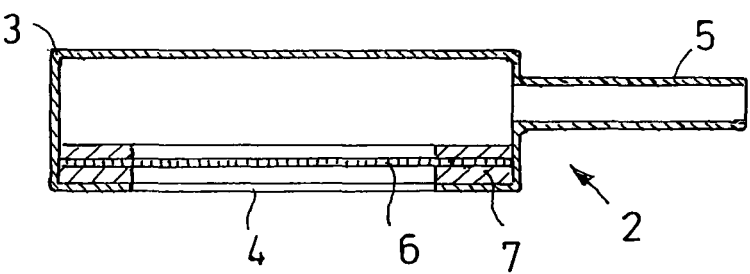

As a result of the fact that the diaphragm 6 is permeable to air, the pressure within the liquid container 1 drops and the force which acts on the diaphragm 6 is reduced, with the result that the diaphragm 6 sinks again in the direction of its initial position (FIG. 4c).

Figure 4D:
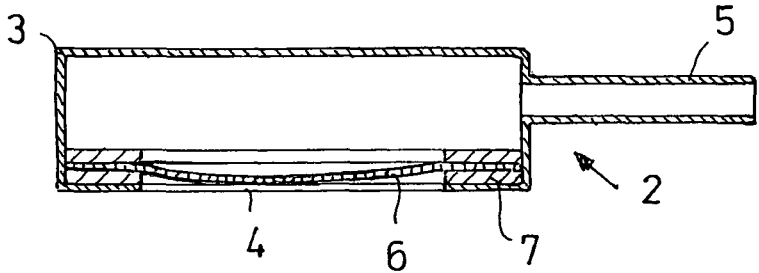

When the liquid container 1 is completely ventilated, the diaphragm 6 returns to its initial position (FIG. 4d).

LIST OF DESIGNATIONS

1 Liquid container
2 Ventilating device
3 Housing
4 First opening
5 Second opening
6 Diaphragm
7 Diaphragm carrier
8 Fluid line

What is claimed is:

1. A container including a ventilating device comprising:
the container comprises a liquid container to contain an aqueous urea solution under different pressures; and
the ventilating device comprising
a housing mounted at an opening of the liquid container, wherein the housing has a first opening to the liquid container and a second opening to surroundings of the liquid container, said second opening having a lowest point;
a diaphragm arranged within the housing that is deformable in response to pressure changes and providing a pumping action to convey fluid such that a volume within the housing exists above the diaphragm as a housing volume, wherein the diaphragm is permeable to air and is impermeable to liquid, and wherein, when pressure increases in the liquid container, the diaphragm is moveable from an unloaded state upward into the housing volume to reduce the housing volume above the diaphragm is deformable into a form that operates with the housing to convey a fluid, when located within the housing volume above the diaphragm, to leave the housing via the second opening to the surroundings of the liquid container;
wherein the diaphragm is arranged within the housing such that the diaphragm sags downward under a force of gravity, and a lowest point of the diaphragm lies at a lower level in an installation position than a plane of fastening points of the diaphragm to the housing; and
wherein the diaphragm operates with said pumping action; and wherein the volume within the housing above the diaphragm in the unloaded state to the lowest point of the second opening is smaller than a maximum pumping volume of the diaphragm.

2. The container including the ventilating device as claimed in claim 1, further comprising a diaphragm carrier within the housing to which the diaphragm is attached.

3. The container including the ventilating device as claimed in claim 2, wherein the diaphragm carrier or the housing comprises one or more struts which extend through an interior of the diaphragm carrier or the housing in a horizontal direction in the installation position.

4. The container including the ventilating device as claimed in claim 3, wherein the struts form a cross shape.

5. The container including the ventilating device as claimed in claim 2, wherein the diaphragm carrier is formed of polyethylene.

6. The container including the ventilating device as claimed in claim 1, wherein the ventilating device is mounted on an upper face of the liquid container.

7. The container including the ventilating device as claimed in claim 1, wherein the diaphragm is arranged in a horizontal plane within the housing.

8. The container including the ventilating device as claimed in claim 1, wherein the diaphragm is formed of polytetrafluoroethylene.

9. The container including the ventilating device as claimed in claim 3, wherein the diaphragm is attached by being molded into the housing or between the struts in the housing or in the diaphragm carrier.

10. The container including the ventilating device as claimed in claim 1, wherein the diaphragm sags downward under the force of gravity in the unloaded state.

11. The container including the ventilating device as claimed in claim 1, wherein a surface of the diaphragm which points to the second opening repels liquid.

12. The container including the ventilating device as claimed in claim 1, wherein the second opening has a fluid line connection.

13. The container including the ventilating device as claimed in claim 12 further comprising a fluid line connected to the fluid line connection, and wherein the fluid line has a maximum length of 10 cm and is arranged in a downward manner in the installation position.

14. The container including the ventilating device as claimed in claim 1, wherein the container and the ventilating device are configured in one piece.

15. A container including a ventilating device comprising:
the container comprises a liquid container to contain an aqueous urea solution under pressure; and
the ventilating device comprising
a housing mounted at an opening of the liquid container, wherein the housing has a first opening to the liquid container and a second opening to surroundings of the liquid container, said second opening having a lowest point;
a diaphragm arranged within the housing that is deformable in response to pressure changes and providing a pumping action to convey fluid such that a volume within the housing exists above the diaphragm as a housing volume, wherein the diaphragm is permeable to air and is impermeable to liquid;
wherein the diaphragm is arranged within the housing such that the diaphragm deflects downward under a force of gravity, and a lowest point of the diaphragm lies at a lower level in an installation position than a plane of fastening points of the diaphragm to the housing;
wherein, when pressure increases in the liquid container, the downward deflection of the diaphragm is transitionable to an upward deflection within the housing into a form that operates with the housing to convey a fluid, when located within the housing volume above the diaphragm, to leave the housing via the second opening to the surroundings of the liquid container;
wherein the diaphragm operates with said pumping action; and wherein the volume within the housing above the diaphragm in the unloaded state to the lowest point of the second opening is smaller than a maximum pumping volume of the diaphragm.

* * * * *